READ-OUT CIRCUIT FOR STATIC MAGNETIC CORE DEVICES

Filed Nov. 5, 1962

INVENTORS,
IRA R. MARCUS
OSVALDO DELLASANTA
BY S. J. Rotondi, A. J. Dupont
& J. P. Edgerton United States Patent Office 3,283,312

Patented Nov. 1, 1966

3,283,312
READ-OUT CIRCUIT FOR STATIC MAGNETIC CORE DEVICES

Ira R. Marcus, Silver Spring, and Osvaldo T. Dellasanta, Rockville, Md., assignors to the United States of America as represented by the Secretary of the Army Filed Nov. 5, 1962, Ser. No. 235,585
2 Claims. (Cl. 340—17.4)

The invention described herein may be manufactured and used by or for the Government of the United States of America for governmental purposes without the payment to us of any royalty thereon.

This invention relates to a readout circuit for static bi-stable memory devices, and more particularly to a non-destructive readout circuit for static magnetic core devices.

Square loop magnetic cores form a class of static bi-stable devices which are especially useful data storage or memory devices, since they may be magnetized with fields of one polarity or the other to store data or information in a binary form. When magnetized to either of the two stable states of residual magnetism which the core can assume, the information stored in this form will remain for an indefinite length of time without the application of any magnetizing force. Square loop magnetic cores find wide application as the basic component of shift register circuits, and specific embodiments of this invention will be shown applied to such registers, although as will be apparent to those skilled in the art the readout circuit of this invention may be used with any bi-stable magnetic memory.

The present invention is directed to an improved means for obtaining an indication of the state of a static bi-stable memory device. Prior art schemes for obtaining such indications have either destroyed the information, that is, changed the state of the device by the sensing process, or have been complex, expensive, and unreliable.

It is an object of this invention to provide a novel, simple, inexpensive, reliable readout circuit for static magnetic memory devices.

Another object of this invention is to provide a novel non-destructive readout circuit for static magnetic memory devices.

A further object of this invention is to provide a non-destructive readout circuit for static magnetic memory devices which can give a continuous indication of the state of the magnetic memory devices in a magnetic core register.

Still another object of this invention is to provide a novel readout circuit for static magnetic memory core devices, which can sense the state of the cores in the device, when the device is not operating.

Still another object of the invention is to provide a novel, simple, reliable, readout circuit which gives an indication of the state of the cores in a static magnetic memory device, as the device is operating.

A still further object of this invention is to provide a novel, simple, non-destructive readout circuit for a static magnetic memory device where the memory device is reset to its original state after an interrogating signal by the indicator current.

Before proceeding with the description of this invention it will be helpful to establish conventions which will aid in its explanation. One stable state of the static bi-stable memory device will be the "1" state, and the other stable state will be the "0" state. The static bi-stable devices illustrated are square hystersis loop magnetic cores. A positive pulse applied to the dot sides of a winding coupled thereto will tend to drive the core to the "0" state. A core switching from the "1" state to the "0" state will produce a positive pulse at the dot side of a winding coupled to the core.

The objects of the present invention are achieved by connecting bi-stable switch means and indicating means to each of the cores to be read. At readout, a pulse is applied to all of the memory devices tending to drive them to one of their two stable states. If a memory device were in its other stable state it will now switch, producing an output pulse which is used to trigger the bi-stable switch means. The bi-stable switch means activates the indicating means. The indicator continues to be activated by the bi-stable means, giving an indication of the state of the memory device, until the bi-stable switch means is returned to its first stable state by some external means.

The specific nature of the invention, as well as other objects, uses and advantages thereof will clearly appear from the following description and from the accompanying drawings in which.

Figure 1:
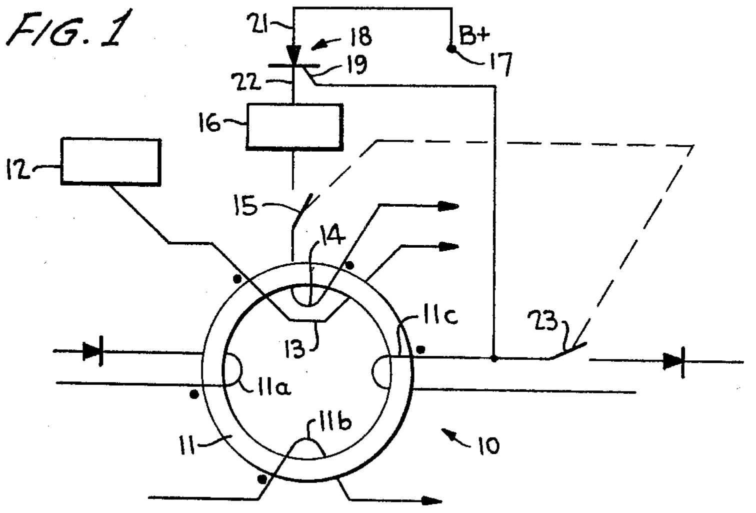
FIG. 1 is a combined block and schematic diagram of a static magnetic core memory device having a non-destructive readout circuit embodying the principles of this invention.

Referring to FIG. 1 there is shown a static bi-stable memory device 10, represented by a square hysteresis loop ferro-magnetic core 11. The core may be a primary core of a shift register such as the register shown in Patent 2,784,390 to Kun Li Chien. Typically, the core 11 would have associated with it an input winding 11_a_, a drive winding 11_b_, and an output winding 11_c_.

The non-destructive readout circuit of this invention comprises an interrogating pulse source 12, an interrogating winding 13, a reset winding 14, a switch means 15, an indicator 16 (which may be a lamp), a power supply source 17 and a bi-stable switch 18.

In a preferred embodiment, bi-stable switch 18 is a silicon controlled rectifier. As is well known in the art, silicon controlled rectifiers (SCR) are essentially thyratron transistors. That is, conduction through the SCR is initiated by a rise in control electrode potential. After initiation, the control electrode loses control and conduction continues through the device until the anode-to-cathode potential falls below some low critical value. Silicon controlled rectifier 18 has a control electrode 19, an anode electrode 21 and a cathode electrode 22. Control electrode 19 is connected to output winding 11_c_, anode electrode 21 is connected to source 17, and cathode electrode 22 is connected through indicator 16 and switch 15 to reset winding 14.

The operation of the non-destructive readout circuit of this invention may be explained as follows. Assume the core is in the "1" state of saturation, and the interrogation pulses from the source 12 are of such a polarity as to drive connected cores to the "0" state of saturation. When it is desired to read the state of the core 11, the switch 15 is closed, which in the embodiment shown opens a switch 23 in the output winding 11*c*. When the switch 15 is closed an interrogating pulse from the source 12 is applied to the core 11 through the winding 13, switching the core from the "1" to the "0" state of saturation.

The core 11 switching from the "1" to the "0" state induces a positive voltage in the dot side of the output 11*c* winding. This voltage is applied to the control electrode 19 of the silicon controlled rectifier 18 which initiates conduction through the SCR 18, from the source 17, and conduction continues after the pulse on control electrode 19 has ended until the conduction is interrupted such as by opening switch 15.

The current flow through SCR 18 activates indicator 16 and provides sufficient ampere turns through winding 14 of such polarity as to switch core 11 back to its original "1" state of saturation. When desired, the switch 15 is opened. Conduction stops, and can only be reestablished by control electrode 19. With the switch 15 open and the switch 23 closed, the system of which device 10 would be a part is ready to resume normal operation.

If the core 11 had contained a "0" when pulsed by interrogating source 12 the core would not have switched, but remained in the "0" state, with only a remanent noise of low voltage appearing on the output winding 11*c*. This noise voltage is insufficient to trigger the SCR 18. The "0" state is, therefore, indicated by the nonactivation of indicator 16.

Figure 2:
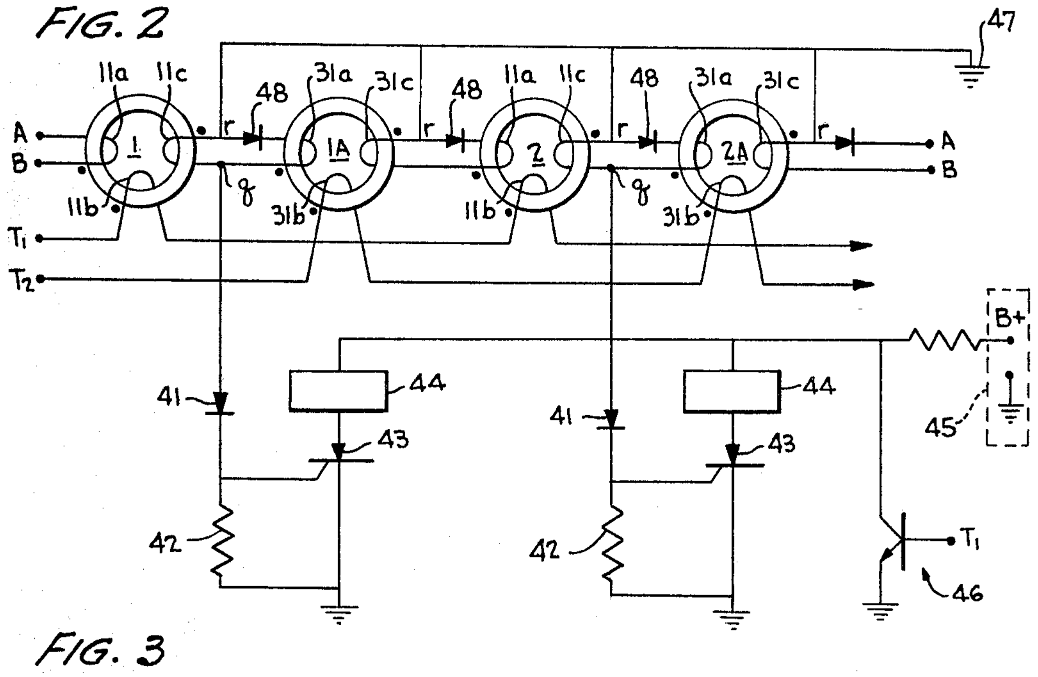
FIG. 2 is a schematic diagram of another embodiment of this invention shown in combination with magnetic core shift register.

Referring to FIG. 2 there is shown a circuit for the continuous readout of a static magnetic core register. The static magnetic register itself is old in the art, and comprises a series of primary storage cores 1, 2, etc., and a series of secondary storage cores 1A, 2A, etc. Each primary storage core, similar to core 11 of FIG. 1, has an input winding 11*a*, a drive winding 11*b*, and an output winding 11*c*. Each secondary storage core has input winding 31*a*, a drive winding 31*b*, and an output winding 31*c*.

Figure 3:
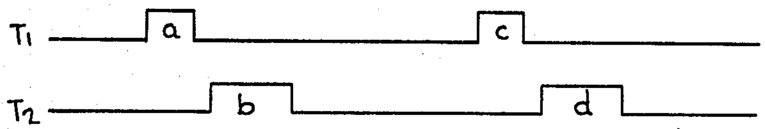
FIG. 3 is a timing diagram of the switching pulses used in the circuit shown in FIG. 2.

The operation of the register thus far described in connection with Fig. 2 is well understood by those skilled in the art. Driving pulses $T_1$ and $T_2$, as shown in FIG. 3, are supplied successively to the drive windings 11*b* and 31*b* tending to drive the connected cores to the "0" state of saturation. If the first core 1 is in the "1" state of saturation a driving pulse $T_1$ will switch the core to the "0" state, producing an output in the winding 11*c* of core 1. The voltage induced in the winding 11*c* is connected to the input windings 31*a* of core 1A, and of such polarity to switch the core 1A to the "1" state. The next drive pulse $T_2$ switches the core 1A back to the "0" state, inducing a voltage in its output winding 11*c* which is connected to the input winding 11*a* of the core 2. This induced voltage switches the core 2 to the "1" state of saturation.

The arrangement described acts as the well known shift register. Any number stored in the register is shifted to the right. The last unit digit on the left is shifted successively, once with each cycle of drive pulses $T_1$ and $T_2$, to the right, and replaced by storage of a zero in the primary storage core from which it was taken. The output is usually taken from the output winding of the last secondary storage core.

In accordance with the teaching of this invention, means are provided to continuously readout the state of the cores of a register of the type just described. Connected to the output winding 11*c* of each primary core is a blocking diode 41, a resistor 42, a silicon controlled rectifier 43, and an indicator 44. All the indicators 44 and silicon controlled rectifier 43 are connected in parallel across a power supply source 45. A transistor shunting switch 46 is connected across the source 45 to shunt out the silicon controlled rectifier 43 when a signal is applied to its base.

With reference to FIGS. 2 and 3, the operation of the continuous readout circuit may be described as follows. Assume the core 1 is in the "1" state of saturation, and the remaining cores of the register are in the "0" state of saturation. Drive pulse $T_{1a}$ FIG. 3 is applied to the drive windings 11*b* and also the base of the transistor switch 46. The pulse $T_{1a}$ applied to the base of the transistor 46 causes its impedance to drop to a very low value, shorting the SCR's 43, thereby interrupting the current flow through them, extinguishing them and any associated indicator 44. Additionally, the pulse $T_{1a}$ transfers the "1" from core 1 to core 1A.

Pulse $T_{2b}$ immediately follows pulse $T_{1a}$ after $T_{1a}$ subsides, and moves the "1" state from the core 1A to the core 2. Point *q* on the output winding 11*c* goes positive with respect to the other side *r*, which is grounded at 47. The diode 48 in series with the winding 11*c* prevents core 2A from switching, and a positive pulse is developed across the resistor 42 connected to the core 2, which is applied to the control grid of the SCR 43 triggering it into conduction. Current from source 45 activates indicator 44 and flows through SCR 43 after the pulse developed across resistor 42 has ended, and until interrupted by shorting switch 46. The indicator 44, therefore, stays on, indicating the presence of a "1" in core 2 until the pulse $T_{1c}$.

The pulse $T_{1c}$ starts a repeat of the process just described. Pulse $T_{1c}$ switches the "1" from core 2 to core 2A. It also extinguishes the current through the SCR 43 and the indicator 44 which are associated with the core 2 by closing shunting transistor switch 46. The pulse $T_{1c}$ repeats the action of pulse $T_{1a}$.

It will be apparent that the embodiments shown are only exemplary and that various modification can be made in construction and arrangement within the scope of the invention as defined in the appended claims.

We claim as our invention:

1. A circuit for sensing the state of a static magnetic memory core device comprising:
   - (a) bi-stable switch means, indicator means, interrogator means, and reset means,
   - (b) means connected to an output of said static bi-stable memory device to conduct a trigger pulse from said output to said bi-stable switch means to trigger said bi-stable switch means to a closed position when said static bi-stable memory means is switched from a first predetermined condition to a second predetermined condition,
   - (c) said interrogator means connected to said core to switch said core from said first predetermined condition, to a second predetermined condition,
   - (d) said bi-stable switch means in said closed position connecting said indicator means and said reset means to power supply means, said power supply means activating said indicator means and said power supply means activating said reset means to reset said core to said first predetermined condition,
   - (e) means to switch said bi-stable switch means to said open position.

2. A circuit for sensing the state of a static magnetic memory core device comprising:
   - (a) bi-stable switch means, indicator means, interrogator means, and reset means,
   - (b) said bi-stable switch means including a semiconductor device having an anode electrode, a cathode electrode, and a control electrode, current flow through said device being initiated by a pulse applied to said control electrode and continuing after the end of said pulse until said current flow is interrupted by a second switch means,
   - (c) said control electrode connected to an output winding of a static magnetic memory core, said static magnetic memory core producing a pulse in said output winding of such polarity as to trigger said bi-stable switch means when said core is switched from a first predetermined state to a second predetermined state, (d) said interrogator means switching said core from said first predetermined state to said second predetermined state, (e) with said second switch means in a closed position, and said bi-stable switch means in a closed state, said indicator means and said reset means being activated by a power supply source, (f) means to open said second switch means.

References Cited by the Examiner

UNITED STATES PATENTS

| | | | |
|---|---|---|---|
| 2,807,006 | 9/1957 | Collins | 307—88 |
| 2,846,669 | 8/1958 | McMillan | 340—174 |
| 2,954,163 | 9/1960 | Okada | 340—174 |
| 2,978,682 | 4/1961 | Green | 340—174 |
| 3,174,139 | 3/1965 | Vecchiarelli | 340—174 |
| 3,199,088 | 8/1965 | Paivinen | 340—174 |

BERNARD KONICK, *Primary Examiner.*

M. S. GITTES, *Assistant Examiner.*